Figure 1:
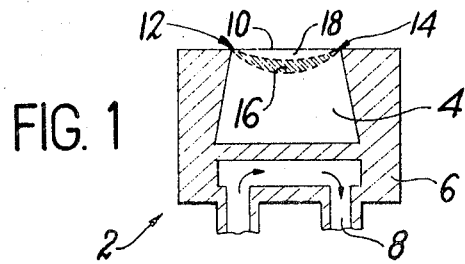

United States Patent
Blattmann et al.

[15] 3,686,519
[45] Aug. 22, 1972

[54] MHD-GENERATOR ELECTRODE WHICH IS INSENSITIVE TO THE ACTION OF ALKALI-METAL SEED MATERIAL

[72] Inventors: Henri Blattmann, 8 Igny; Jean Javellaud, Chilly-Mazarin; David Yerouchalmi, Le Mesnil-Saint-Denis, all of France

[73] Assignee: Commissariat A L'Energie Atomique

[22] Filed: March 18, 1971

[21] Appl. No.: 125,734

[30] Foreign Application Priority Data

March 25, 1970  France......................7010731

[52] U.S. Cl..................................................310/11
[51] Int. Cl................................................H02n 4/02
[58] Field of Search..................................310/10, 11

[56] References Cited

UNITED STATES PATENTS

| | | |
|---|---|---|
| 3,406,300 | 10/1968 | Teno et al...................310/11 |
| 3,454,798 | 7/1969 | Yerouchalmi...............310/11 |
| 3,280,349 | 10/1966 | Brenner et al..............310/11 |

*Primary Examiner*—D. X. Sliney
*Attorney*—Cameron, Kerkam & Sutton

[57] ABSTRACT

A composite electrode for MHD conversion ducts is constituted by identical elements in juxtaposed relation, each main element being made up of ceramic blocks assembled in a metallic support and each block being essentially made up of a current-collecting ceramic element which is placed between two heat-insulating ceramic elements. The electrode is unaffected by the corrosive action of molten alkali-metal seed material within the duct.

2 Claims, 2 Drawing Figures

Patented Aug. 22, 1972

3,686,519

MHD-GENERATOR ELECTRODE WHICH IS INSENSITIVE TO THE ACTION OF ALKALI-METAL SEED MATERIAL

This invention relates to magnetohydrodynamic (MHD) generator electrodes in which the ceramic components are not subject to corrosion caused by the molten alkali-metal seed material in zones in which this latter usually collects and which are heated to a temperature in the vicinity of the melting point of said seed material.

In fact, it is known that the salts of alkali metals which constitute the seed material and have the intended function of increasing the ionization of the hot gaseous fluid which passes through a duct are in the state of vapor within said fluid. In this form, said salts have practically no corrosive action.

However, so far as concerns the configuration of conventional composite electrodes having components of conductive ceramic material which are cooled laterally by metallic support members, the different portions of the electrode surface are brought to very different temperatures. Whereas some points of the electrodes which are in contact with the gaseous fluid are brought to very high temperatures, other portions which are also in contact with the fluid have temperatures which are lower than the temperatures of vaporization of the seed material. In consequence, the seed material liquifies in predetermined zones of the external surfaces of the ceramic components of the electrodes. Migration of the seed material from these zones then takes place in a highly corrosive liquefied form, thereby resulting in gradual destruction of the electrodes.

FIG. 1 illustrates an electrode of this type and permits a clear explanation of this phenomenon. The electrode unit 2 is constituted by a conductive element 4 of ceramic material which is fitted within a metallic support member 6 of copper, said support member being cooled by a water circulation 8. The mixture of gaseous fluid and seed material which is in contact with the front face 10 of the electrode 2 is brought to a temperature of at least 2,000°C. The center of the surface of the ceramic component which is exposed to the gas stream is heated to approximately 1,700°C. The temperature of the external edges of the front face of the copper component is comprised between 200° and 300°C. Along the front face of the electrode 2, the temperature variation is subject to discontinuities at the points of junction between the ceramic components 4 and copper components 6; and the isotherms 880° and 900°C which are temperatures in the vicinity of the temperatures of vaporization of an alkali-metal seed pass through said junctions 12 and 14 which constitute the lines of penetration of said alkali-metal seed which has a corrosive action on the ceramic material. By way of example, it will be indicated that, in the case of a seed consisting of potassium carbonate $K_2CO_3$, the vaporization temperature is 890°C. As a result of the phenomenon of penetration, the ceramic component 4 incurs damage within an area which is shown in the plane of the figure by a crescent-shaped outline 16 and the top portion 18 of said component is detached from the electrode. Below a temperature of 880°C, the seed remains in solid form and diffuses very slowly into the remainder of the ceramic material.

After initial detachment of the portion 18, successive crescents form at progressively greater depths within the ceramic component 4, with the result that the ceramic material content of the electrode 2 is completely removed.

The aim of the invention is to overcome this defect of MHD electrodes, a typical design of which has just been described.

The composite electrode which is provided in accordance with the invention for application to MHD power generation systems is constituted by identical main elements in juxtaposed relation, each main element being made up of ceramic blocks assembled in a metallic support and each block being essentially made up of a current-collecting ceramic element placed between two heat-insulating ceramic elements.

Aside from these main arrangements, the invention is also concerned with a number of different secondary arrangements which will be mentioned hereinafter and which relate to one embodiment of the invention.

Stainless steel elements have lower heat conductivity than copper and are therefore brought to temperatures which are higher than 950°–1,000°C. There is therefore no danger of migration of the alkali-metal seed material in liquid form.

The electrically conductive ceramic elements are of two types. One type consists of current collectors which are preferably fabricated from zirconium $ZrO_2$ or from lanthanum chromite $LaCrO_3$. The other type consists of thermal insulators which are preferably formed of magnesia $MgO$ or of strontium zirconate $SrZrO_3$ which has a high melting temperature and is little affected by molten alkali-metal salts. The result thereby achieved is that, at the points of contact between ceramic elements of both types at the hot face and at a temperature of the order of 1,500°C, there is no longer any possibility of migration of alkali-metal salts.

In short, the composite electrodes which are constructed in the manner which has been described in the foregoing are virtually insensitive to the action of molten alkali-metal salts.

In order that the present invention and its different technical advantages may be more readily apparent, one exemplified embodiment will now be described solely with reference to FIG. 2 of the accompanying drawings, it being understood that said embodiment does not imply any limitation in regard to either modes of execution or potential applications.

Figure 2:
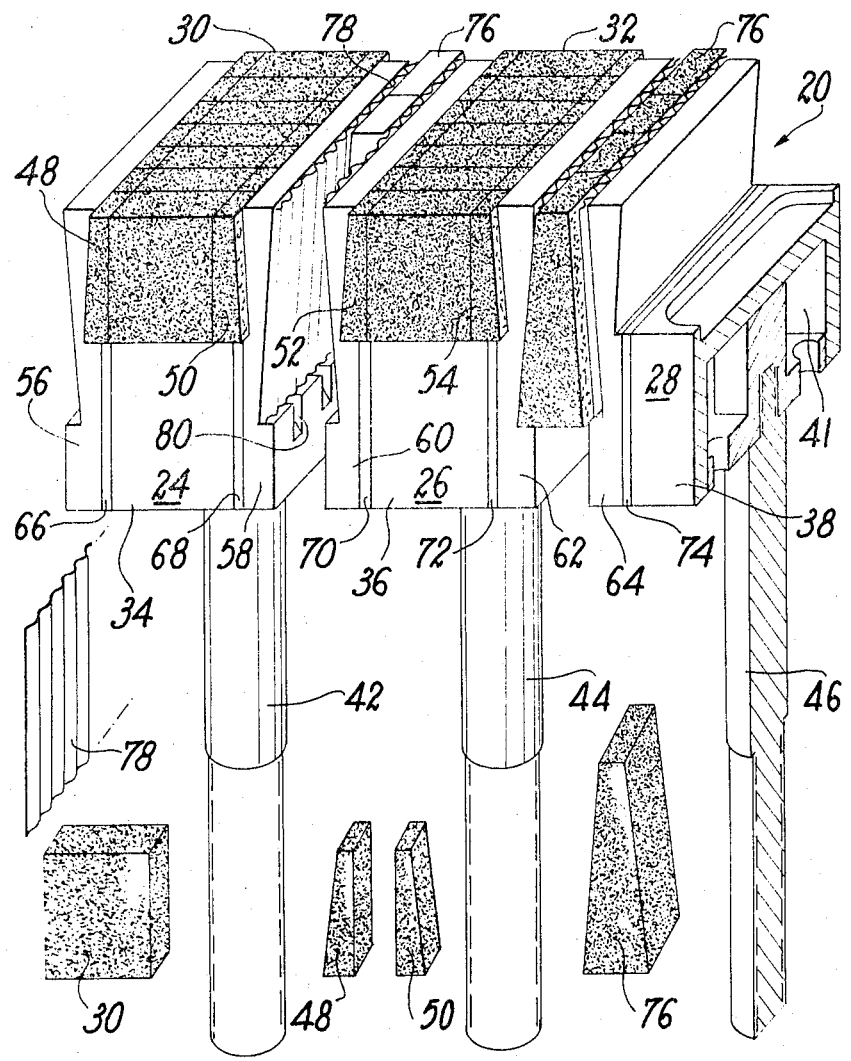

FIG. 2 is a partial illustration of a composite electrode 20 in accordance with the invention. The external face of the electrode is flush with the surface of one duct wall which is parallel to the magnetic field. Said electrode is made up of a plurality of identical main elements 24, 26 and 28, the last-mentioned element 28 being shown in longitudinal cross-section and each element being constituted by several types of particular elements. Each main element comprises current-collecting elements 30 or 32, the external surfaces of which each form one section of said duct face. The rear faces of said current-collecting elements are in contact with a rear component 34, 36 or 38 formed of copper and cooled by a water circulation passage 41 which is visible in the case of the cut main element 28. Said components are rigidly fixed to threaded fastening rods 42, 44 and 46. The ceramic current-collecting elements 30, 32 are located between heat-insulating ceramic elements 48 and 50 or 52 and 54. The elements of both types thus constitute ceramic blocks which are in contact with each other by means of platinum grids (not shown in the figure). Said grids improve the transmission of electric current from the front of the electrode to the copper components. The temperature of said grids must remain lower than 1,700°C in order to prevent melting.

The assemblies consisting of current-collecting elements, insulating elements and rear copper components are securely held in position between metallic members (56, 58–60, 62–64 and so forth), the surfaces of said members which are in contact with the hot gases being made of stainless steel. In order that the copper-stainless steel junction may readily be formed, the members 56, 58–60, 62 and 64 are machined in a stainless steel and copper laminate. The welded joints 66, 68, 70, 72 and 74 between the components which are partly composed of stainless steel and the copper components are therefore formed between surfaces of the last-mentioned metal (copper) and very intimate contacts are thus established.

It will be noted that the structure of the metallic support of each main electrode element is such that the parts which are in contact with the gases are of stainless steel whilst those which are cooled are of copper. In consequence, the temperature at the external surface of the electrodes is not below the range of 950° to 1,000°C which stainless steels are capable of withstanding and is not lower than the temperature of liquefaction of the seed material.

The main elements 24, 26 and 28 of the composite electrode are assembled mechanically by means of prismatic spacer members 76 having a trapezoidal cross-section and formed of insulating refractory ceramic material. Corrugated stainless steel sheets 78 are placed between said ceramic elements and the components 56, 58, 60, 62 and 64 which are partly composed of stainless steel and grooves 80 are formed in these latter in order that compressed air under low pressure is capable of circulating along the grooves of said corrugated sheets.

We claim:

1. A composite electrode for a magnetohydrodynamic generator comprising identical main elements, each of said main elements including one ceramic current collector disposed between two heat-insulating ceramic elements, each block being disposed in a metallic holder, a rear copper portion for said holder, means for the circulation of a coolant fluid in said portion, two lateral stainless steel jaws for said holder welded to said rear copper portion, metallic channel elements disposed outward of said jaws and from each side of said metallic holder, a spacer between said elements, a box opposite the contact with the hot gas and defined by the under face of said spacer and the two lateral sides of two adjacent jaws, a plurality of grooves formed by said elements between said box and the hot side of the heat-insulating ceramic material for the passage of compressed air.

2. A composite electrode in accordance with claim 1, wherein the metallic channel elements are formed by corrugated stainless steel.

* * * * *